United States Patent Office 3,502,657
Patented Mar. 24, 1970

3,502,657
PRODUCTION OF 2,3-EPITHIOSTEROIDS
Taichiro Komeno, Osaka, Japan, assignor to Shionogi & Co., Ltd., Osaka, Japan
No Drawing. Continuation-in-part of application Ser. No. 520,868, Jan. 17, 1966. This application Sept. 29, 1967, Ser. No. 671,569
Claims priority, application Japan, Dec. 19, 1961, 36/46,266
Int. Cl. C07c *173/00, 169/22*
U.S. Cl. 260—239.5    11 Claims

ABSTRACT OF THE DISCLOSURE

The 2,3-epithio-steroids:

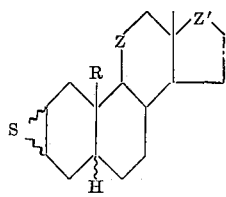

exhibit specific physiological activities such as marked inhibition of gonadotropin secretion, anti-esterogenic activity, androgenic and anabolic activities, progestational activity, ovulation inhibition and/or delay activities, etc. and accordingly they are useful as medicinals for human and veterinary use.

Wherein R is hydrogen or methyl, Z is methylene, hydroxymethylene or carbonyl and Z' is carbonyl or a group of the formula:

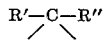

in which R' is lower alkyl, hydroxy, acyloxy, acetyl, hydroxyacetyl or an acyloxy acetyl group and R" is hydrogen, lower alkyl, lower alkenyl, lower alkynyl, hydroxy or acyloxy.

---

This application is a continuation-in-part of copending application Ser. No. 520,868, filed Jan. 17, 1966, and now abandoned, which is a division of application Ser. No. 390,233, filed Aug. 17, 1964, now U.S. Patent No. 3,230,215, which is a continuation-in-part of application Ser. No. 366,594, filed May 11, 1963, which is a continuation-in-part of application Ser. Nos. 244,876 and 327,481, filed Dec. 17, 1962 and Dec. 2, 1963, respectively, the last three applications being now abandoned.

The present invention relates to the production of 2,3-epithio-steroids having the following formula:

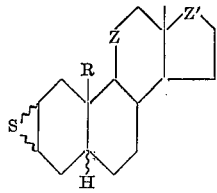

In the above Formula I, the ripple mark ($) represents α- or β-configuration, R is hydrogen or methyl, Z is methylene, hydroxymethylene or carbonyl and Z' is carbonyl or a group of the formula:

in which R' is lower alkyl, hydroxy, acyloxy, acetyl, hydroxyacetyl or acyloxyacetyl and R" is hydrogen, lower alkyl, lower alkenyl, lower alkynyl, hydroxy or acyloxy.

The acyl in the said groups is preferably derived from carboxylic acids having from one to about twelve carbon atoms, conveniently employed in the steroid art, and having a molecular weight less than about 200. Representative of the acyl moiety which can be present are lower alkanoyl (e.g. formyl, acetyl, propionyl, butyryl, isobutyryl, valeryl, isovaleryl, caproyl, enanthoyl, capryloyl, trimethylacetyl), lower alkenoyl (e.g. crotonoyl, undeconyl), carboxy(lower)alkanoyl (e.g. succinyl), cycloalkyl(lower)alkanoyl (e.g. β-cyclopentylpropionyl, β-cyclohexylpropionyl), monocarboxylic aroyl (e.g. benzoyl, p-toluyl, p-nitrobenzoyl, 3,4,5-trimethoxybenzoyl), monocarbocyclic aryl(lower)alkanoyl or alkenoyl (e.g. phenylacetyl, β-phenylpropionyl, cinnamoyl) and monocarbocyclic aryloxy(lower)alkanoyl (e.g. p-chlorophenoxyacetyl).

It is a basic object of the present invention to embody a process for the production of 2,3-epithio-steroids of Formula I. Another object of this invention is to embody steroids useful and necessary as intermediate of the 2,3-epithio-steroids. A further object of the invention is to embody a process for converting 2,3-epoxy-steroids into 2,3-epithio-steroids. These and other objects will be apparent to those conversant with the art to which the present invention pertains from the subsequent description.

The process of the invention is represented by the following scheme:

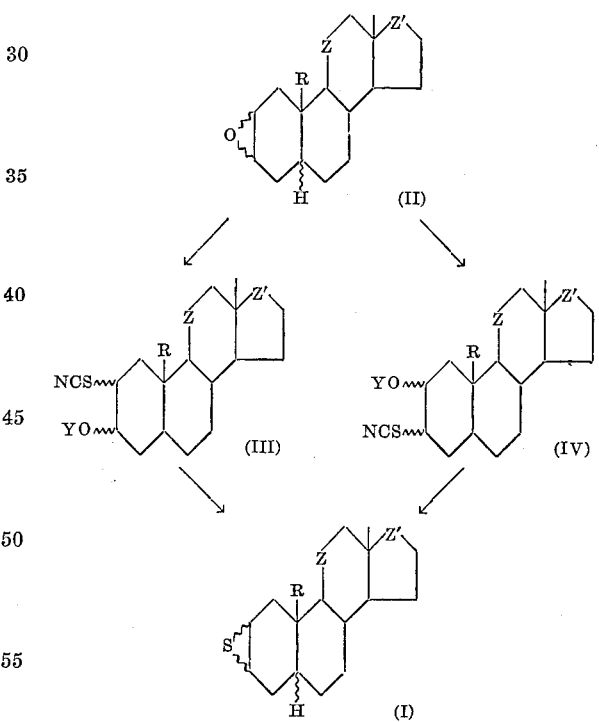

wherein Y is hydrogen atom, lower alkanoyl (e.g. formyl, acetyl, propionyl, butyryl), lower alkanesulfonyl (e.g. methanesulfonly, ethanesulfonyl), benzenesulfonyl or lower alkylbenzenesulfonyl (e.g. p-toluenesulfonyl), and R, Z and Z' each has the same significance as designated above.

Examples of the starting material (II) include:
2α,3α-epoxy-5α-cholestane,
2β,3β-epoxy-5α-cholestane,
2β,3β-epoxy-5β-cholestane,
2α,3α-epoxy-5α-cholanic acid,
methyl 2β,3β-epoxy-5β-cholanate,
2β,3β-epoxy-5α-estran-17β-ol and its 17-lower alkanoates such as acetate, propionate, butyrate and caprylate, 2α,3α-epoxy-5α-estran-17β-ol and its 17-lower alkanoates such as acetate and propionate,
2α,3α-epoxy-5α-androstan-17-one,
2β,3β-epoxy-5α-androstan-17-one,
2α,3α-epoxy-5β-androstan-17-one,
2α,3α-epoxy-5α-androstan-17β-ol and its 17-lower alkanoates such as acetate, propionate, butyrate and caprylate,
2α,3α-epoxy-5β-androstan-17β-ol and its 17-lower alkanoates such as acetate and propionate,
2β,3β-epoxy-5β-androstan-17β-ol and its 17-lower alkanoates such as acetate and propionate,
2β,3β-epoxy-5α-androstan-17β-ol and its 17-lower alkanoates such as acetate, propionate, butyrate, valerate, isovalerate, caproate, enanthate and caprylate,
2β,3β-epoxy-5α-androstan-17β-ol 17-benzoate,
2β,3β-epoxy-5α-androstan-17β-ol 17-(β-phenylpropionate),
2β,3β-epoxy-5α-androstan-17β-ol 17-(10-undecenoate),
2β,3β-epoxy-5β-androstane-11,17-dione,
2α,3α-epoxy-5α-androstane-11,17-dione,
2β,3β-epoxy-17α-lower alkyl-5α-androstan-17β-ols such as 2β,3β-epoxy-17α-methyl-5α-androstan-17β-ol, 2β,3β-epoxy-17α-ethyl-5α-androstan-17β-ol and 2β,3β-epoxy-17α-propyl-5α-androstan-17β-ol,
2β,3β-epoxy-17α-lower alkenyl-5α-androstan-17β-ols such as 2β,3β-epoxy-17α-vinyl-5α-androstan-17β-ol and 2β,3β-epoxy-17α-propenyl-5α-androstan-17β-ol,
2β,3β-epoxy-17α-lower alkynyl-5α-androstan-17β-ols such as 2β,3β-epoxy-17α-ethynyl-5α-androstan-17β-ol and 2β,3β-epoxy-17α-propynyl-5α-androstan-17β-ol,
2α,3α-epoxy-5α-pregnan-20-one,
2α,3α-epoxy-5β-pregnan-20-one,
2β,3β-epoxy-5α-pregnan-20-one,
2β,3β-epoxy-5β-pregnan-20-one,
2β,3β-epoxy-5α-pregnane-11,20-dione,
2β,3β-epoxy-11β-hydroxy-5α-pregnan-20-one,
2β,3β-epoxy-17α,21-dihydroxy-5α-pregnane-11,20-dione, etc.

According to the present invention, the starting 2,3-epoxide compound (II) is first subjected to thiocyanatohydrin formation. The reaction is carried out substantially by the action of thiocyanic acid. Practically, the reaction may be carried out with thiocyanic acid or its salt (e.g. sodium thiocyanate) in an inert solvent (e.g. water, methanol, acetone, ether, tetrahydrofuran, dioxane, chloroform, dichloromethane) at a temperature from about 0° C. to the boiling point of the solvent used within about 5 days, if required, in the presence of catalytic influence of an acid (e.g. acetic acid) or a base (e.g. pyridine). In this reaction course, 2α,3α-epoxide (II) gives generally 2β-thiocyanato-3α-hydroxy compound (III) and 2β,3β-epoxide (II) gives generally 3α-thiocyanato-2β-hydroxy compound (IV) in 5α-series, whereas 2α,3α-epoxide (II) gives generally 3β-thiocyanato-2α-hydroxy compound (IV) and 2β,3β-epoxide (II) gives generally 2α-thiocyanato-3β-hydroxy compound (III) in 5β-series.

The resultant thiocyanatohydrin compound (III or IV) is then subjected to epithio linkage-formation as it is or after converting the hydroxy group in the thiocyanatohydrin system into a lower alkanoyloxy, lower alkanesulfonyloxy, benzenesulfonyloxy and lower alkylbenzenesulfonyloxy. For the previous conversion of the hydroxyl group into such a group may be performed by treating the thiocyanatohydrin compound (III or IV) in a per se conventional acylation procedure.

Examples of the thiocyanatohydrin compound (III and IV) include:

2β-thiocyanato-5α-cholestan-3α-ol and its 3-acylates such as acetate, methanesulfonate and benzenesulfonate,
3α-thiocyanato-5α-cholestan-2β-ol and its 2-acylates such as formate, acetate, methanesulfonate and p-toluenesulfonate,
2α-thiocyanato-5β-cholestan-3β-ol and its 3-acylates such as acetate, propionate and p-toluenesulfonate,
2β-thiocyanato-3α-hydroxy-5α-cholanic acid and its 3-acylate such as ethanesulfonate,
methyl 2α-thiocyanato-3β-hydroxy-5β-cholanate and its 3-acylates such as acetate and methanesulfonate,
3α-thiocyanato-5α-estrane-2β,17β-diol and its 17-lower alkanoates such as acetate, propionate, butylate and caprylate, and their 2-acylates such as acetate, methanesulfonate and p-toluenesulfonate,
2β-thiocyanato-5α-estrane-3α,17β-diol and its 17-lower alkanoates such as acetate and propionate, and their 3-acylates such as acetate, propionate and methanesulfonate,
2β-thiocyanato-3α-hydroxy-5α-androstan-17-one and its 3-acylates such as acetate, methanesulfonate and p-toluenesulfonate,
3α-thiocyanato-2β-hydroxy-5α-androstan-17-one and its 2-acylates such as acetate, methanesulfonate and p-toluenesulfonate,
3β-thiocyanato-2α-hydroxy-5β-androstan-17-one and its 2-acylates such as acetate and p-toluenesulfonate,
2β-thiocyanato-5α-androstane-3α,17β-diol and its 17-lower alkanoates such as acetate, propionate, butyrate and caprylate, and their 3-acylates such as acetate, methanesulfonate and benzenesulfonate,
2α-thiocyanato-5β-androstane-3β,17β-diol and its 17-alkanoates such as acetate and propionate, and their 3-acylates such as acetate, propionate, ethanesulfonate and p-toluenesulfonate,
3α-thiocyanato-5α-androstane-2β,17β-diol and its 17-lower alkanoates such as acetate, propionate, butyrate, valerate, isovalerate, caproate, enanthate and caprylate, and their 2-acylates such as formate, acetate, methanesulfonate and p-toluenesulfonate,
3α-thiocyanato-5α-androstane-2β,17β-diol 17-benzoate and its 2-acylates such as methanesulfonate and p-toluenesulfonate,
3α-thiocyanato-5α-androstane-2β,17β-diol 17 - (β-phenylpropionate) and its 2-acylate such as methanesulfonate,
3α-thiocyanato-5α-androstane-2β,17β-diol 17 - (10-undecenoate) and its 2-acylate such as methanesulfonate,
2α-thiocyanato-3β-hydroxy-5β-androstane-11,17-dione and its 3-acylate such as methanesulfonate,
2β-thiocyanato-3α-hydroxy-5α-androstane-11,17-dione and its 3-acylate such as methanesulfonate,
3α-thiocyanato-17α-lower alkyl - 5α - androstane-2β,17β-diols such as 3α-thiocyanato-17α-methyl-5α-androstane-2β,17β-diol, 3α - thiocyanato-17α-ethyl-5α-androstane-2β,17β-diol and 3α-thiocyanato-17α-propyl-5α-androstane-2β,17β-diol, and their 2-acylates such as acetate, methanesulfonate and p-toluenesulfonate,
3α-thiocyanato-17α-lower alkenyl-5α-androstane-2β,17β-diols such as 3α-thiocyanato-17α-vinyl-5α-androstane-2β,17β-diol and 3α-thiocyanato-17α-propenyl-5α-androstane-2β,17β-diol, and their 2-acylates such as methanesulfonate,
3α-thiocyanato-17α-lower alkynyl-5α-androstane-2β,17β-diols such as 3α-thiocyanato-17α-ethynyl-5α-androstane-2β,17β-diol and 3α-thiocyanato-17α-propynyl-5α-androstane-2β,17β-diol, and their 2-acylates such as methanesulfonate,
2β-thiocyanato-3α-hydroxy-5α-pregnan-20-one and its 3-acylates such as acetate and methanesulfonate,
3β-thiocyanato-2α-hydroxy-5β-pregnan-20-one and its 2-acylates such as acetate and methanesulfonate,
3α-thiocyanato-2β-hydroxy-5α-pregnan-20-one and its 2-acylates such as acetate, methanesulfonate and p-toluene-sulfonate,
2α-thiocyanato-3β-hydroxy-5β-pregnan-20-one and its 3-acylates such as acetate, methanesulfonate,
3α-thiocyanato-2β-hydroxy-5α-pregnane-11,20-dione and its 2-acylate such as methanesulfonate,
3α-thiocyanato-2β,11β-dihydroxy-5α-pregnan-20-one and its 2-acylates such as acetate and methanesulfonate, 3α-thiocyanato-2β,17β,21-trihydroxy-5α-pregnane-11,20-dione and its acylates such as acetate and methanesulfonate, etc.

The epithio linkage-formation may be effected by reacting the free or acylated thiocyanatohydrin (III or IV) with a basic agent (e.g. alumina, sodium bicarbonate, potassium bicarbonate, calicum hydroxide, sodium carbonate, potassium carbonate, sodium acetate, sodium methoxide, sodium hydroxide, potassium hydroxide) in an inert solvent (e.g. water, methanol, ethanol, propanol, isopropanol, benzene, toluene, petroleum ether, diglyme (diethylene glycol dimethyl ether), ether, tetrahydrofuran, dioxane) whereby 2,3-epithio linkage is produced. The configuration of the said epithio linkage is conducted by the configuration of the thiocyanato group in the thiocyanatohydrin (III or IV). It is generally preferred to carry out the reaction at a relatively mild condition, i.e. at a temperature not higher than 100° C. within about 5 days. It is notable that the epithio linkage-formation via previously acylated derivative provides neither convenience nor better yield than the process using free thiocyanatohydrin.

In the course of the above conversion route the hydroxy group or the acyloxy group at 17, 21 or, in some case, 11-position may be interchanged simultaneously or optionally by the conventional method.

Examples of the resultant 2,3-epithio-steroids (I) include:

2β,3β-epithio-5α-cholestane,
2α,3α-epithio-5α-cholestane,
2α,3α-epithio-5β-cholestane,
2β,3β-epithio-5α-cholanic acid,
methyl 2α,3α-epithio-5β-cholanate,
2α,3α-epithio-5α-estran-17β-ol and its 17-lower alkanoates such as acetate, propionate, butyrate and caprylate,
2β,3β-epithio-5α-estran-17β-ol and its 17-lower alkanoates such as acetate and propionate,
2β,3β-epithio-5α-androstan-17-one,
2α,3α-epithio-5α-androstan-17-one,
2β,3β-epithio-5β-androstan-17-one,
2β,3β-epithio-5α-androstan-17β-ol and its 17-lower alkanoates such as acetate, propionate, butyrate and caprylate, 2β,3β-epithio-5β-androstan-17β-ol, and its 17-lower alkanoates such as acetate and propionate,
2α,3α-epithio-5β-androstan-17β-ol and its 17-lower alkanoates such as acetate and propionate,
2α,3α-epithio-5α-androstan-17β-ol and its 17-lower alkanoates such as acetate, propionate, butyrate, valerate, isovalerate, caproate, enanthate and caprylate,
2α,3α-epithio-5α-androstan-17β-ol 17-benzoate,
2α,3α-epithio-5α-androstan-17β-ol 17-(β-phenylpropionate),
2α,3α-epithio-5α-androstan-17β-ol 17-(10-undecenoate),
2α,3α-epithio-5β-androstane-11,17-dione,
2β,3β-epithio-5α-androstane-11,17-dione,
2α,3α-epithio-17α-lower alkyl-5α-androstan-17β-ols such as 2α,3α-epithio-17α-methyl-5α-androstan-17β-ol, 2α,3α-epithio-17α-ethyl-5α-androstan-17β-ol and 2α,3α-epithio-17α-propyl-5α-androstan-17β-ol,
2α,3α-epithio-17α-lower alkenyl-5α-androstan-17β-ols such as 2α,3α-eipthio-17α-vinyl-5α-androstan-17β-ol and 2α,3α-epithio-17α-propenyl-5α-androstan-17β-ol,
2α,3α-epithio-17α-lower alkynyl-5α-androstan-17β-ols such as 2α,3α-epithio-17α-ethynyl-5α-androstan-17β-ol and 2α,3α-epithio-17α-propynyl-5α-androstan-17β-ol,
2β,3β-epithio-5α-pregnan-20-one,
2β,3β-epithio-5β-pregnan-20-one,
2α,3α-epithio-5α-pregnan-20-one,
2α,3α-epithio-5β-pregnan-20-one,
2α,3α-epithio-5α-pregnane-11,20-dione,
2α,3α-epithio-11β-hydroxy-5α-pregnan-20-one,
2α,3α-epithio-17α,21-dihydroxy-5α-pregnane-11,20-dione, etc.

The 2,3-epithio-steroids (I) prepared by the present process exhibit specific physiological activities such as marked inhibition of gonadotropin secretion, anti-estrogenic activity, androgenic and anabolic activities, progestational activity, ovulation inhibition and/or delay activitives, etc. and accordingly, they are useful as medicinals for human and veterinary use. For instance 2β,3β-epithio-5α-androstan-17β-ol and its acetate respectively produce marked inhibition of gonadotropin secretion at a total dose of 10 milligrams with the manifestation of slight androgenic response in the test using mice. Further, for instance, 2α,3α-epithio-5α-androstan-17β-ol and its 17-lower alkanoates such as acetate and propionate respectively exhibit marked inhibition of gonadotropin hypersecretion at a dose of not more than 0.1 milligram with concomitant androgenic and anabolic responses with a favorable ratio and anti-estrogenic response in the test using mice. These steroids also produce the complete block of ova-implantation, when subcutaneously administered to rats from the first day of pregnancy for 6 days at a dose of 1 milligram per day. Furthermore, for instance, 2α,3α - epithio-17α-methyl-5α-androstan-17β-ol produces potent anabolic and androgenic activities with a favorable ratio by the oral administration to rats. The other disclosed 2,3-epithio-steroids show the same physiological activities. The products of the present invention are useful as, for instance, controlling agents for disease of menopause, ovulation-inhibition agents, controlling agents for hypergonadism, precocious puberty and mammary tumor, and as anabolic agents. They can be administered e.g. orally in doses comparable to those supra depending upon the weight of the mammal recipient.

The following examples represent presently-preferred embodiments of the present invention, but it is to be understood that the examples are given by way of illustration only and not of limitation. The relationship of parts by weight to parts to volume is the same as that between grams and milliliters.

EXAMPLE 1

A solution of potassium thiocyanate (20 parts by weight) in iced water (20 parts by volume) is covered with ether (40 parts by volume). To the mixture, there is added dropwise 85% phosphoric acid (30 parts by weight). The mixture is shaken and then separated to remove ethereal layer, which is thereafter dried over anhydrous sodium sulfate. To the ethereal solution there is added a solution of 2α,3α-epoxy-5α-cholestane (3.50 parts by weight) in ether (10 parts by volume.). The resultant mixture is allowed to stand overnight at room temperature. The reaction mixture is washed with diluted aqueous sodium carbonate solution and water in order, dried over anhydrous sodium sulfate and evaporated to dryness. The residue is recrystallized from hexane to give 2β-thiocyanato-5α-cholestan-3α-ol (3.20 parts by weight) as needles melting at 161 to 163° C.

A solution of 2β-thiocyanato-5α-cholestan-3α-ol (2.27 parts by weight) and potassium hydroxide (5 parts by weight) in ethanol (100 parts by volume) is refluxed for 30 minutes. To the reaction mixture, there is added water. The precipitate is collected by filtration and crystallized from ether-acetone mixture to give 2β,3β-epithio-5α-cholestane (2.07 parts by weight) as scales melting at 120 to 122° C.

EXAMPLE 2

2β,3β-epoxy-5α-cholestane (6.10 parts by weight) is treated wth thiocyanic acid in ether as described in Example 1 and the product is recrystallized from acetone-hexane mixture and further with acetone-methanol mixture to give 3α-thiocyanato-5α-cholestan-2β-ol (5.96 parts by weight) as colorless needles melting at 165 to 167° C.

A solution of 3α-thiocyanato-5α-cholestan-2β-ol (1.70 parts by weight) and potassium hydroxide (1.5 parts by weight) in methanol (40 parts by volume) is refluxed for 10 minutes. To the reaction mixture, there is added water. The precipitate is collected by filtration and crystallized from acetone to give 2α,3α-epithio-5α-cholestane (1.25 parts by weight) as needles melting at 123 to 124° C.

EXAMPLE 3

A solution of 2β-thiocyanato-5α-cholestan-3α-ol (0.69 part by weight) in ether (40 parts by volume) is added dropwise to a stirring suspension of lithium aluminum hydride (0.12 part by weight) in ether (10 parts by volume) at room temperature. The resultant mixture is stirred under reflux for 1 hour and then poured into a mixture of 5%-hydrochloric acid and ice pieces. The ethereal layer is collected, washed with dilute aqueous sodium carbonate solution and water in order, dried over anhydrous sodium sulfate and evaporated. The residue is chromatographed over Florisil (20 parts by weight). The eluate from petroleum ether-benzene mixture (95:5 1:1) is recrystallized from acetone to give 2β-mercapto-5α-cholestan-3α-ol (0.46 part by weight) as needles melting at 122 to 124° C.

Acetylation of this compound with a mixture of acetic anhydride and pyridine gives diacetate as small needles melting at 119 to 120° C.

A solution of 2β-acetylthio-3α-acetyloxy-5α-cholestane (0.60 part by weight) and potassium hydroxide (1 part by weight) in methanol (20 parts by volume) is refluxed for 10 minutes. To the reaction mixture, there is added water. The precipitate is collected by filtration and crystallized from acetone to give 2β,3β-epithio-5α-cholestane (0.46 part by weight) as scales melting 120 to 122° C.

2β-acetylthio-3α-acetyloxy-5α-cholestane is prepared by reacting 2α,3α-epoxy-5α-cholestane with ethanethiolic acid while refluxing, followed by acetylating the resultant 2β-acetylthio-5α-cholestan-3α-ol in a conventional manner.

EXAMPLE 4

A solution of 3α-thiocyanato-5α-cholestan-2β-ol (1.01 parts by weight) in ether (60 parts by volume) is added dropwise to a stirring suspension of lithium aluminum hydride (0.17 part by weight) in ether (20 parts by volume). The resultant mixture is refluxed for 1 hour and then poured into a mixture of 5%-hydrochloric acid and ice pieces. The ethereal layer is collected, washed with dilute aqueous sodium carbonate solution and water in order, dried over anhydrous sodium sulfate and evaporated. The residue is chromatographed over Florisil (30 parts by weight). The eluate from petroleum ether-benzene mixture (2:1) is recrystallized from methanol to give 3α-mercapto-5α-cholestan-2β-ol (0.71 part by weight) as colorless leaflets melting at 118 to 120° C.

Acetylation of this compound with a mixture of acetic anhydride and pyridine gives diacetate as needles melting at 141 to 143° C.

To a solution of 3α-acetylthio-2β-acetyloxy-5α-cholestane (0.41 part by weight) in ethanol (20 parts by volume), there is added potassium hydroxide (0.8 part by weight). The resultant mixture is refluxed for 20 minutes, poured into water, and extracted with ether. The ether extract is worked up as usual to yield crude product, which in turn dissolved in petroleum ether and passed through a volume of alumina to give 2α,3α-epithio-5α-cholestane (0.32 part by weight) melting at 122 to 123° C.

3α-acetylthio - 2β - acetyloxy-5α-cholestane is prepared by reacting 2β,3β-epoxy-5α-cholestane with ethanethiolic acid while refluxing, followed by acetylating the resultant 3α-acetylthio-5α-cholestan-2β-ol in a conventional manner.

EXAMPLE 5

2α,3α-epoxy-5α-androstan-17β-ol acetate (4.00 parts by weight) is added to a thiocyanic acid solution prepared from potassium thiocyanate (30 parts by weight), concentrated phosphoric acid (85%, 70 parts by weight) and ether (50 parts by volume) and the resultant solution is allowed to stand overnight at room temperature. The reaction mixture is separated to collect ethereal layer, which is washed with dilute aqueous sodium carbonate solution and water in order, dried over anhydrous sodium sulfate and evaporated to dryness. The residue is recrystallized from methanol to give 2β-thiocyanato-5α-androstane-3α,17β-diol 17-acetate (3.30 parts by weight) as colorless needles melting at 160 to 162° C.

To a solution of 2β-thiocyanato-5α-androstane-3α,17β-diol 17-acetate (2.74 parts by weight) in pyridine (20 parts by volume), methanesulfonyl chloride (3.0 parts by volume) is added under cooling. The mixture is allowed to stand at 0° C. overnight, poured into iced water and extracted with ether-chloroform mixture (3:1). The extract is washed with dilute aqueous hydrochloric acid, water, dilute aqueous sodium carbonate solution and water in order, dried over anhydrous sodium sulfate, and evaporated to dryness. Crystallization of the residue from ether gives crystalline 2β-thiocyanato-3α-methanesulfonyloxy-5α-androstan-17β-ol 17-acetate (2.84 parts by weight) melting at 150 to 154° C.

A solution of 2β-thiocyanato-3α-methanesulfonyloxy-5α-androstan-17β-ol 17-acetate (2.29 parts by weight) in petroleum ether-benzene mixture (4:1) (50 parts by volume) is treated with alumina (70 parts by weights) and allowed to stand for 48 hours at room temperature (around 15° C.). The eluate with benzene is evaporated to dryness and the residue (1.69 parts by weight) is crystallized from ethanol to give 2β,3β-epithio-5α-androstan-17β-ol 17-acetate (1.41 parts by weight) as scales melting at 162 to 164° C.

EXAMPLE 6

A solution of 2β-thiocyanato-3α-methanesulfonyloxy-5-α-androstan-17β-ol 17-acetate (0.97 part by weight) and potassium hydroxide (1 part by weight) in diglyme (20 parts by volume) is stirred for 48 hours at room temperature (around 15° C.). To the reaction mixture, there is added water whereby crystals precipitate. The crystals are collected by filtration, washed with water, dried and recrystallized from ethanol to give 2β,3β-epithio-5α-androstan-17β-ol 17-acetate (0.50 part by weight) as plates melting at 156° C. The ethanolic mother liquor is chromatographed over alumina. The eluate with benzene-petroleum ether mixture (4:1) is evaporated to dryness whereby the additional product (0.05 part by weight) is obtained. This additional product is combined with the previously obtained product and recrystallized from ethanol to give pure crystals melting at 162 to 164° C.

EXAMPLE 7

A solution of 2β-thiocyanato-3α-methanesulfonyloxy-5α-androstan-17β-ol 17-acetate (0.82 part by weight) and potassium hydroxide (0.9 part by weight) in diglyme (20 parts by volume) is refluxed on a water bath for 24 hours while stirring. To the reaction mixture, there is added water, and the separated substance is collected by filtration and recrystallized from hexane to give 2β,3β-epithio-5α-androstan-17β-ol (0.60 part by weight) as crystals melting at 132.5 to 134° C.

EXAMPLE 8

A solution of 2β,3β-epoxy-5α-androstan-17β-ol 17-acetate (3.38 parts by weight) in ether (20 parts by volume) is added to a thiocyanic acid solution prepared from potassium thiocyanate (20 parts by weight), 85% phosphoric acid (30 parts by weight) and ether (30 parts by volume). The resultant mixture is allowed to stand for 2 days at room temperature. The reaction mixture is washed with dilute aqueous sodium carbonate solution and water in order, dried over anhydrous sodium sulfate, and evaporated to dryness. Recrystallization of the resultant residue from ether-hexane mixture gives 3α-thiocyanato-5α-androstane-2β,17β-diol 17-acetate (3.82 parts by weight) as needles melting 153 to 154° C.

To a solution of this compound (2.62 parts by weight) in pyridine (26 parts by volume), there is added methanesulfonyl chloride (2.6 parts by volume) under cooling. The mixture is allowed to stand overnight at room temperature, poured into iced water and extracted with ether. The etheral extract is washed with dilute hydrochloric acid, dilute aqueous sodium carbonate solution and water in order, dried over anhydrous sodium sulfate, and then evaporated. Twice recrystallization of the evaporation residue from ether-petroleum ether gives 2β-methanesulfonyloxy-3α-thiocyanato-5α-androstan-17β-ol 17-acetate (1.80 parts by weight) melting at 178 to 179° C.

A solution of 2β-methanesulfonyloxy-3α-thiocyanato-5α-androstan-17β-ol 17-acetate (1.79 parts by weight) and potassium hydroxide (1.5 parts by weight) in diglyme (36 parts by volume) is stirred for 41.5 hours at room temperature (around 15° C.). To the reaction mixtures, there is added water, and the resultant mixture is shaken with chloroform. The chloroform layer is washed with water, dried and evaporated to dryness. The residue (1.2 parts by weight) is chromatographed over alumina. The eluates with petroleum ether and a mixture of benzene and petroleum ether (1:9) are evaporated and crystallized from methanol to give 2α,3α-epithio-5α-androstan-17β-ol 17-acetate (0.19 part by weight) as plates melting at 144 to 145° C.

The above alumina is then eluted with benzene and the eluate is evaporated to dryness. The residue is crystallized from acetone to give 2α,3α-epithio-5α-androstan-17β-ol (0.53 part by weight) as prisms melting at 123 to 125° C.

This substance is acetylated by heating with a mixture of pyridine and acetic anhydride for 2 hours to give 2α,3α-epithio-5α-androstan-17β-ol 17-acetate (0.46 part by weight).

EXAMPLE 9

A solution of 3α-thiocyanato-5α-androstane-2β-17β-diol 17-acetate (0.30 part by weight) and potassium carbonate (1.5 parts by weight) in methanol (30 parts by volume) is allowed to stand at room temperature (around 15° C.) overnight. After addition of water to the reaction mixture, the precipitated crystals are collected by filtration, washed with water and dried to give 2α,3α-epithio-5α-androstan-17β-ol (0.27 part by weight) melting at 123 to 125° C.

This substance is acetylated by allowing to stand with a mixture of pyridine and acetic anhydride at room temperature overnight. The resultant mixture is, after addition of water, shaken with ether. The ether extract is washed with water and dried, and the solvent removed. The residue is crystallized from methanol to give 2α,3α-epithio-5α-androstan-17β-ol 17-acetate (0.21 part by weight) as plates melting at 144 to 145° C.

EXAMPLE 10

2β,3β-epoxy-5α-androstan-17β-ol is acylated according to the conventional manner with propionyl chloride in pyridine to convert to 2β,3β-epoxy-5α-androstan-17β-ol 17-propionate. The propionate is treated with thiocyanic acid in ether to give 3α-thiocyanato-5α-androstane-2β,17β-diol 17-propionate, which is converted to 3α-thiocyanato-2β-methanesulfonyloxy-5α-androstan-17β-ol 17-propionate by reaction with methanesulfonyl chloride in pyridine, according to the similar procedure as described in Example 8.

2β-methanesulfonyloxy-3α-thiocyanato-5α-androstan-17β-ol 17-propionate is treated with potassium hydroxide in diglyme as in Example 6 to give 2α,3α-epithio-5α-androstan-17β-ol 17-propionate as crystals melting at 142 to 143° C.

EXAMPLE 11

2β,3β-epoxy-5α-androstan-17β-ol is acylated according to the conventional manner with capryloyl chloride in pyridine to convert to 2β,3β-epoxy-5α-androstan-17β-ol 17-caprylate. The caprylate is treated with thiocyanic acid in ether to give 3α-thiocyanato-5α-androstane-2β,17β-diol 17-caprylate, which converted to 3α-thiocyanato-2β-methanesulfonyloxy-5α-androstan-17β-ol 17-caprylate by reacting with methanesulfonyl chloride in pyridine, according to the similar procedure as described in Example 8.

2β-methanesulfonyloxy-3α-thiocyanato-5α-androstan-17β-ol 17-caprylate is treated with potassium hydroxide in diglyme as in Example 6 to give 2α,3α-epithio-5α-androstan-17β-ol 17-caprylate as scales melting at 100 to 101.5° C.

EXAMPLE 12

2β,3β-epoxy-5α-androstan-17β-ol is acylated according to the conventional manner with β-phenylpropional chloride in pyridine to convert to 2β,3β-epoxy-5α-androstan-17β-ol 17-(β-phenylpropionate). The β-phenylpropionate is treated with thiocyanic acid in ether to give 3α-thiocyanato-5α-androstane-2β,17β-diol 17-(β-phenylpropionate), which is converted to 3α-thiocyanato-2β-methanesulfonyloxy-5α-androstan-17β-ol 17-(β-phenylpropionate) by reacting with methanesulfonyl chloride in pyridine, according to the similar manner as described in Example 8.

2β-methanesulfonyloxy-3α-thiocyanato-5α-androstan-17β-ol 17-(β-phenylpropionate) is treated with potassium hydroxide in diglyme as in Example 6 to give 2α,3α-epithio-5α-androstan-17β-ol 17-(β-phenylpropionate) as needles melting at 148 to 149° C.

EXAMPLE 13

2β,3β-epoxy-5α-androstan-17β-ol is acylated according to the conventional manner with 10-undecenoyl chloride in pyridine to convert to 2β,3β-epoxy-5α-androstan-17β-ol 17-(10-undecenoate). The undecenoate is treated with thiocyanic acid in ether to give 3α-thiocyanato-5α-androstane-2β,17β-diol 17-(10-undecenoate), which is converted to 3α-thiocyanato-2β-methanesulfonyloxy-5α-androstan-17β-ol 17-(10-undecenoate) by reacting with methanesulfonyl chloride in pyridine, according to the similar manner to Example 8.

3α-thiocyanato-2β-methanesulfonyloxy-5α-androstan-17β-ol 17-(10-undecenoate) is treated with potassium hydroxide in diglyme as in Example 6 to give 2α,3α-epithio-5α-androstan-17β-ol 17-(10-undecenoate) as crystals melting at 83.5 to 85° C.

EXAMPLE 14

According to the similar procedure as described in Examples 10 to 13, the following compounds are prepared: 2α,3α-epithio-5α-androstan-17β-ol 17-valerate melting at 104 to 106° C., 2α,3α-epithio-5α-androstan-17β-ol 17-isovalerate melting at 133 to 134° C., 2α,3α-epithio-5α-androstan-17β-ol 17-enanthate melting at 107 to 109° C., and 2α,3α-epithio-5α-androstan-17β-ol 17-benzoate melting at 140 to 142° C.

EXAMPLE 15

2α,3α-epithio-5α-androstan-17β-ol (0.52 part by weight) in a mixture of pyridine (2.0 parts by volume) and propionic anhydride (0.7 part by volume) is allowed to stand overnight at room temperature. The reaction mixture is diluted with iced water. The resultant crystals are collected by filtration, dried, and recrystallized from methanol to give 2α,3α-epithio-5α-androstan-17β-ol 17-propionate (0.61 part by weight) as crystals melting at 142 to 143° C.

EXAMPLE 16

According to the similar procedure to Example 15, 2α,3α-epithio-5α-androstan-17β-ol is acylated with valeric anhydride in pyridine to give 2α,3α-epithio-5α-androstan-17β-ol 17-valerate as crystals melting at 104 to 106° C., with isovaleric anhydride in pyridine to give 2α,3α-epithio-5α-androstan-17β-ol 17-isovalerate as crystals melting at 133 to 134° C., with enanthic anhydride in pyridine to give 2α,3α-epithio-5α-androstan-17β-ol 17-enanthate as scales melting at 107 to 109° C., with caprylic anhydride in pyridine to give 2α,3α-epithio-5α-androstan-17β-ol 17-caprylate as scales melting at 100 to 101.5° C., with β-phenylpropionyl chloride in pyridine to give 2α,3α-epithio-5α-androstan-17β-ol 17-(β-phenylpropionate) as needles melting at 148 to 149° C., with 10-undecenoic anhydride or 10-undecenoyl chloride in pyridine to give 2α,3α-epithio-5α-androstan-17β-ol 17-(10-undecenoate) as scales melting at 83.5 to 85° C., and with benzoyl chloride in pyridine to give 2α,3α-epithio-5α-androstan-17β-ol 17-benzoate as crystals melting at 140 to 142° C.

EXAMPLE 17

2β,3β-epithio-5α-androstan-17β-ol (0.50 part by weight) in a mixture of pyridine (2 parts by volume) and acetic anhydride (1 part by volume) is allowed to stand overnight at room temperature. The reaction mixture is diluted with iced water. The resultant crystals are collected by filtration, washed with water, dried and recrystallized from ethanol to give 2β,3β-epithio-5α-androstan-17β-ol 17-acetate as prisms melting at 162 to 164° C. Mother liquor of the above recrystallization is subjected to chromatography over alumina. Recrystallization of the eluate with benzene-petroleum ether mixture (1:4) from ethanol affords the same product (total yield, 0.42 part by weight).

EXAMPLE 18

To a solution of 2β,3β-epoxy-17α-methyl-5α-androstan-17β-ol (2.65 parts by weight) in chloroform (10 parts by volume), there is added a solution of thiocyanic acid prepared from potassium thiocyanate (15 parts by weight), concentrated phosphoric acid and ether (50 parts by volume). The resultant mixture is allowed to stand overnight at room temperature and then extracted with chloroform. The extract is washed with aqueous sodium carbonate solution and water in order, dried over anhydrous sodium sulfate and evaporated. The residue is recrystallized from dichloromethanemethanol mixture to give 3α-thiocyanato-17α-methyl-5α-androstane-2β,17β-diol (2.27 parts by weight) melting at 188 to 190° C.

This compound is then treated with methane-sulfonyl chloride in pyridine to yield 2β-methanesulfonyloxy-3α-thiocyanato-17α-methyl-5α-androstan-17β-ol.

To a suspension of 2β-methanesulfonyloxy-3α-thiocyanato-17α-methyl-5α-androstan-17β-ol (2.15 parts by weight) in a mixture of diglyme (50 parts by volume) and tetrahydrofuran (10 parts by volume), there is added a solution of potassium hydroxide (2.5 parts by weight) in water (4 parts by volume), and the resultant solution is stirred overnight at room temperature (around 15° C.). To the reaction mixture, there is added water, and the resultant mixture is shaken with dichloromethane. The dichloromethane layer is washed with water, dried and evaporated to dryness. The residue is chromatographed on alumina (35 parts by weight). The eluates with a mixture of petroleum ether and benzene (1:2), benzene and a mixture of benzene and ether (95:5) are combined together, concentrated and crystallized from aqueous acetone to give 2α,3α-epithio-17α-methyl-5α-androstan-17β-ol (0.91 part by weight) as needles melting at 168 to 169° C. $[\alpha]_D^{23.5}$ +3.4±2° (c.=1.045 in chloroform).

IR: $\nu_{max}^{Nujol}$ 3356 cm.$^{-1}$

Analysis.—Calcd. for $C_{20}H_{32}OS$ (percent): C, 74.94; H, 10.06; S, 10.00. Found (percent): C, 75.11, H, 10.17; S, 9.86.

EXAMPLE 19

To a solution of 3α-thiocyanate-17α-ethyl-5α-androstane-2β,17β-diol (3.74 parts by weight) in dioxane (60 parts by volume), there are added a solution of potassium carbonate (5.5 parts by weight) in water (30 parts by volume) and methanol (100 parts by volume), and the resultant mixture is allowed to stand overnight at room temperature (around 15° C.). The reaction mixture is concentrated under reduced pressure and water is added thereto. The resultant precipitate is collected by filtration, crystallized from ether-petroleum ether mixture and recrystallized from acetone-hexane mixture to give 2α,3α-epithio-17α-ethyl-5α-androstan-17β-ol (2.49 parts by weight) as crystals melting at 146 at 148° C.

The starting material of this example, 3α-thiocyanato-17α-ethyl-5α-androstane-2β,17β-diol, can be prepared by reacting 2β,3β-epoxy-5α-androstan-17-one [J. Fajkos et al.: Chem. Abstracts, vol. 53, p. 5343 (1959)] with potassium acetylide in a mixture of tetrahydrofuran and ether at room temperature, reducing catalytically the resultant 2β,3β-epoxy-17α-ethynyl-5α-androstan-17β-ol using pallaidum-calcium carbonate in ethyl acetate and reacting the resulting 2β,3β-epoxy-17α-ethyl-5α-androstan-17β-ol with an etheral solution of thiocyanic acid at room temperature.

EXAMPLE 20

To a solution of 2β,3β-epoxy-17α-vinyl-5α-androstan-17β-ol and (3.85 parts by weight) in dichloromethane (50 parts by volume), there is added a solution of thiocyanic acid prepared from potassium thiocyanate (20 parts by weight), concentrated phosphoric acid (30 parts by weight) and ether (50 ml.) and the resultant solution is allowed to stand overnight. The reaction mixture is worked up as in Example 18 and recrystallized from acetone-hexane mixture to give 3α-thiocyanato-17α-vinyl-5α-androstane-2β,17β-diol (3.74 parts by weight) melting at 179 to 180° C.

To a solution of 3α-thiocyanato-17α-vinyl-5α-androstane-2β,17β-diol (3.61 parts by weight) in dioxane (50 parts by volume), there is added a solution of potasium carbonate (4.5 parts by weight) in a mixture of water (20 parts by volume) and methanol (50 parts by volume). The resultant mixture is stirred overnight at room temperature and worked up as in Example 18. The product is crystallized from aqueous acetone and recrystallized from acetone-hexane mixture to give 2α,3α-epithio-17α-vinyl-5α-androstan-17β-ol (2.26 parts by weight) melting at 136 to 138° C.

The starting material, 2β,3β-epoxy-17α-vinyl-5α-androstan-17β-ol is prepared by reducing catalytically 2β,3β-epoxy-17α-ethynyl-5α-androstan-17β-ol using Lindler catalyst in ethyl acetate.

EXAMPLE 21

To a solution of 2β,3β-epoxy-17α-ethynyl-5α-androstan-17β-ol (4.23 parts by weight) in dichloromethane (60 parts by volume), there is added a thiocyanic acid solution prepared from potassium thiocyanate (20 parts by weight), concentrated phosphoric acid (30 parts by weight) and ether (40 parts by volume). The resultant mixture is allowed to stand overnight and extracted with dichloromethane. The extract is washed with aqueous sodium carbonate solution and water in order, dried over anhydrous sodium sulfate and evaporated to dryness. The residue is recrystallized from acetone-hexane mixture to give 3α-thiocyanato-17α-ethynyl-5α-androstane-2β,17β-diol (4.38 parts by weight) melting at 196 to 198° C.

To a solution of 3α-thiocyanato-17α-ethynyl-5α-androstane-2β,17β-diol (3.68 parts by weight) in dioxane (60 parts by volume), there are added a solution of potassium carbonate (3.7 parts by weight) in water (27 parts by volume) and methanol (85 parts by volume) and the resultant mixture is stirred overnight. The reaction mixture is concentrated under reduced pressure, diluted with water. The crystals thereby formed are collected by filtration, washed with water, dried and recrystallized from dichloromethane-methanol mixture to give 2α,3α-epithio-17α-ethynyl-5α-androstan-17β-ol (1.76 parts by weight) melting at 177 to 178° C. Mother liquor of the crystallization is subjected to chromatography. Eluate with benzene-ether mixture (2:1) gives the same crystals (total yield, 2.37 parts by weight).

EXAMPLE 22

2β,3β-epoxy - 5α - androstan-17-one is treated with an ethereal solution of thiocyanic and at room temperature, and the resultant 2β-hydroxy - 3α - thiocyanato-5α-androstan-17-one is treated with p-toluenesulfonyl chloride in pyridine at a temperature between 0 and 10° C. to give 2β-p-toluensulfonyloxy-3α-thiocyanato - 5α-androstan-17-one, in a manner similar to Example 8.

A solution of 2β-p-toluenesulfonyloxy-3α-thiocyanato-5α-androstan-17-one (1.98 parts by weight) and potassium hydroxide (1.5 parts by weight) in diglyme (40 parts by volume) is stirred for 48 hours at room temperature (around 15° C.). To the reaction mixture, there is added water, and the resultant mixture is shaken with etherchloroform mixture. The organic layer is collected, washed with water, dried and evaporated to dryness. The residue (1.41 parts by weight) is crystallized from methanol to give 2α,3α-epithio-5α-androstan-17-one (1.18 parts by weight) as needles melting at 107 to 108° C.

The said 2α-3α-epithio-5α-androstan-17-one is also prepared from a 2α,3α-epithio-5α-androstan-17β-ol by oxidation with chromium trioxide in pyridine at room temperature (around 15° O) for about 20 hours.

EXAMPLE 23

2α,3α-epoxy-5α-androstan-17-one is treated with an etheral solution of thiocyanic acid at room temperature, and the resultant 2β-thiocyanato-3α-hydroxy-5α-androstan-17-one is treated with methanesulfonyl chloride in pyridine at a temperature between 0 and 10° C. to give 2β - thiocyanato-3α-methanesulfonyloxy-5α-androstan-17-one, in a manner similar to Example 8.

2β - thiocyanato - 3α-methanesulfonyloxy-5α-androstan-17-one is treated with potassium hydroxide in diglyme as in Example 22 to give 2β,3β-epithio-5α-androstan-17-one.

EXAMPLE 24

2β,3β-epoxy-5α-estran-17β-ol is treated with an etheral solution of thiocyanic acid at room temperature, and the resultant 3α-thiocyanato-5α-estrane-2β,17β-diol melting at 187 to 189° C. is treated with potassium carbonate in dioxane-water-methanol mixture at room temperature to give 2α,3α-epithio-5α-estran-17β-ol melting at 115.5 to 117° C., in a similar manner to Example 19.

The starting material, 2β,3β-epoxy-5α-estran-17β-ol is prepared by treating 2α-bromo-17β-acetyloxy-5α-estran-3 - one with lithium tri - t - butoxy aluminum hydride, and treating the resultant 2α - bromo - 17β - acetyloxy-5α-estran-3β-ol with potassium hydroxide in isopropanol, followed by treatment with potassium carbonate in aqueous methanol.

EXAMPLE 25

2β,3β-epoxy-5α-estran-17β-ol-acetate is treated with an etheral solution of thiocyanic acid at room temperature, and the resultant 3α-thiocyanato-5α-estrane-2β,17β-diol 17-acetate melting at 144 to 146°C. is treated with methane-sulfonyl chloride in pyridine to give 3α-thiocyanato-2β-methanesulfonyloxy-5α-estran-17β-ol 17-acetate, as in Example 8.

3α - thiocyanato-2β-methanesulfonyloxy-5α-estran-17β-ol 17 acetate is treated with potassium hydroxide in diglyme as in Example 22 to give 2α,3α-epithio-5α-estran-17β-ol 17-acetate melting at 88 to 89° C.

This compound can also be prepared by treating 2α-bromo-17β-acetyloxy-5α-estran-3-one with etheral solution of thiocyanic acid in the presence of alkali, reducing the resultant 2α - thiocyanato - 17β-acetyloxy-5α-estran-3-one with lithium tri-t-butoxy aluminum hydride, treating the resultant 2α-thiocyanato-5α-estrane-3β,17β-diol 17-acetate with methanesulfonyl cloride in pyridine and the resultant 2α-thiocyanato-3β-ethanesulfonyloxy-5α-estran-17β-ol 17-acetate with potassium hydroxide in diglyme as in Example 22.

EXAMPLE 26

2α,3α-epoxy-5α-estran-17β-ol 17-acetate is treated with an etheral solution of thiocyanic acid at room temperature, and the resultant 2β-thiocyanato-5α-estrane-3α,17β-diol 17-acetate melting at 146 to 147° C. is treated with methanesulfonyl chloride in pyridine to give 2β-thiocyanato-3α-methanesulfonyloxy-5α-estran-17β-ol 17 - acetate melting at 154 to 155° C., in a manner similar to Example 8.

This compound gives 2β,3β-epithio-5α-estran-17β-ol melting at 122 to 124° C. by treatment with potassium hydroxide in methanol-dioxane mixture at room temperature and gives 2β,3β-epithio-5α-estran-17β-ol 17-acetate melting at 120 to 122° C. by treatment with potassium carbonate in warmed aqueous dioxane.

EXAMPLE 27

To a solution of 2β,3β-epoxy-5α-pregnan-20-one (4.70 parts by weight) in chloroform (50 parts by volume), there is added an ethereal solution of thiocyanic acid prepared from potassium thiocyanate (30 parts by weight), concenterated phosphoric acid (45 parts by weight) and ether (50 parts by volume). The resultant solution is allowed to stand overnight, diluted with large amount of dichloromethane, washed with water, aqueous dilute sodium carbonate and water in order, dried and evaporated. The residue is recrystallized from dichloromethaneacetone mixture to give 2β-hydroxy-3α-thiocyanato-5α-pregnan-20-one (3.90 parts by weight) melting at 229 to 231° C.

To a solution of 2β-hydroxy-3α-thiocyanato15α-pregnan-20-one (3.00 parts by weight) in dioxane (50 parts by volume), there are added a solution of potassium carbonate (4.0 parts by weight) in water (20 parts by volume) and methanol (50 parts by volume), and the resultant mixture is stirred at room temperature (around 15° C.) overnight. Then, the reaction mixture is concentrated under reduced pressure and water is added thereto. The precipitate is collected by filtration, washed with water, dried and crystallized from dichloromethane-acetone mixture to give 2α,3α-epithio-5α-pregnan-20-one (1.60 parts by weight) as crystals melting at 163 to 165° C.

The starting material, 2β,3β-epoxy-5α-pregnan-20-one is prepared treating 5α-pregn-2-en-20-one with N-bromoacetamide and perchloric acid in dioxane and treating the resultant 2β - hydroxy - 3α-bromo-5α-pregnan-20-one with potassium hydroxide in isopropanol.

EXAMPLE 28

2β,3β-epoxy-5α-pregnane-11,20-dione is treated with an ethereal solution of thiocyanic acid at room temperature, and the resultant 2β-hydroxy-3α-thiocyanato-5α-pregnane-11,20-dione is treated with potassium carbonate in a mixture of dioxane, water and methanol at room temperature to give 2α,3α-epithio-5α-pregnane-11,20-dione, in a manner similar to Example 27.

The starting material, 2β,3β-epoxy-5α-pregnane-11,20-dione is prepared by treating 5α-pregn-2-ene-11,20-dione with N-bromoacetamide and perchloric acid in dioxane and treating the resultant 2β-hydroxy-3α-bromo-5α-pregnane-11,20-dione with potassium hydroxide in isopropanol.

EXAMPLE 29

2β,3β-epoxy-11β-hydroxy-5 -pregnan-20-one is treated with an ethereal solution of thiocyanic acid at room temperature, and the resultant 2β,11β-dihydroxy-3α-thiocyanato-5α-pregnan-20-one is treated with potassium carbonate in a mixture of dioxane, water and methanol at room temperature to give 2α,3α-epithio-11β-hydroxy-5α-pregnan-20-one, in a manner similar to Example 27.

The starting material of this example, 2β,3β-epoxy-11β-hydroxy-5α-pregnan-20-one is prepared by reacting 3β,11β-dihydroxy-5α-pregnan-20-one with p-toluenesulfonyl chloride in pyridine, reacting the resultant 3β-p-toluenesulfonyloxy-11β-hydroxy-5α-pregnan-20-one with collidine in xylene, reacting the resultant 11β-hydroxy-5α-pregn-2-en-20-one with N-bromoacetamide and perchloric acid in dioxane and treating the resultant 2β,11β-dihydroxy-3α-bromo-5α-pregnan-20-one with potassium hydroxide in isopropanol.

EXAMPLE 30

To a solution of 2β-hydroxy-3α-thiocyanato-5α-pregnan-20-one (7.00 parts by weight) in pyridine (200 parts by volume), there is added methanesulfonyl chloride (7.0 parts by volume) under cooling with ice. The resultant mixture is allowed to stand overnight at 0° C. The reaction mixture is diluted with iced water and filtered to collect crystalline precipitate. The precipitate is washed with water, dried and recrystallized from methanol to give 2β-methanesulfonyloxy-3α-thiocyanato-5α-pregnan - 20 - one (6.15 parts by weight) melting at 148 to 150° C.

A solution of 2β-methanesulfonyloxy-3α-thiocyanato-5α-pregnan-20-one (5.50 parts by weight) in tetrahydrofuran (80 parts by volume) is combined with potassium hydroxide (5.50 parts by weight) and isopropanol (10 parts by volume), and the resultant mixture is stirred for 1.5 hours at room temperature (around 15° C.). The reaction mixture is combined with water. The precipitate is collected by filtration, washed with water, dried and crystallized from dichloromethane-acetone mixture to to give 2α,3α-epithio-5α-pregnan-20-one (2.06 parts by weight) as crystals melting at 163 to 165° C.

What is claimed is:

1. A process for preparing a 2,3-epithio-steroid which comprises reacting a member selected from the group consisting of steroids of the formulae:

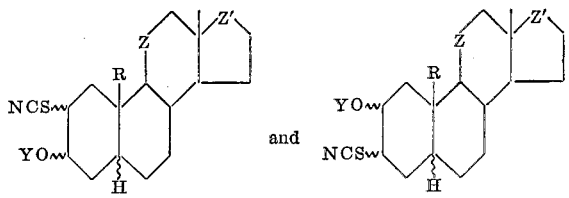

wherein R is a member selected from the group consisting of hydrogen and methyl; Y is a member selected from the group consisting of hydrogen, lower alkanoyl, lower alkanesulfonyl, benzensulfonyl and lower alkylbenzenesulfonyl; Z is a member selected from the group consisting of methylene, hydroxymethylene and carbonyl; Z' is a member selected from the group consisting of carbonyl,

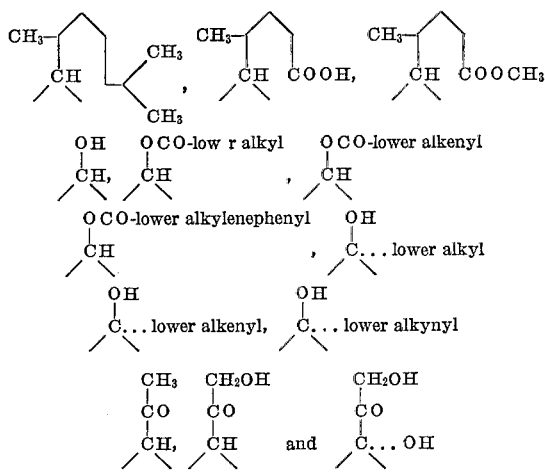

and the ripple mark (⸾) is a generic indication of α- and β-configurations, with an inorganic basic compound in an inert solvent at a temperature not higher than 100° C. for less than 5 days, to give the corresponding 2,3-epithio-steroid of which the configuration of the epithio group corresponds to that of the NCS group in the starting material.

2. A process according to claim 1, wherein the inorganic basic compound is selected from the group consisting of alumina, sodium bicarbonate, potassium bicarbonate, sodium carbonate, potassium carbonate, calcium hydroxide, sodium hydroxide and potassium hydroxide.

3. A process according to claim 1, wherein the inert solvent is selected from the group consisting of water, methanol, ethanol, propanol, isopropanol, benzene, toluene, petroleum ether, diglyme, ether, tetrahydrofuran and dioxane.

4. A process according to claim 1, wherein Y is hydrogen.

5. A process according to claim 1, wherein Y is hydrogen, the basic agent is selected from the group consisting of alumina, sodium bicarbonate, potassium bicarbonate, sodium carbonate, potassium carbonate, calcium hydroxide, sodium hydroxide and potassium hydroxide, and the inert solvent is selected from the group consisting of water, methanol, ethanol, propanol, isopropanol, benzene, toluene, petroleum ether, diglyme, ether, tetrahydrofuran and dioxane.

6. A process for preparing a thiocyanatohydrin compound selected from the group consisting of steroids of the formulae:

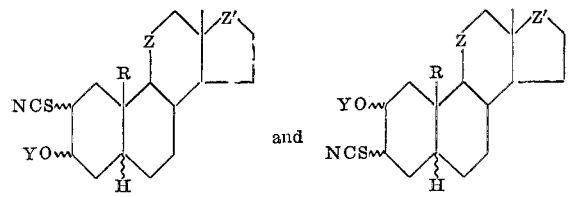

wherein R is a member selected from the group consisting of hydrogen and methyl; Y is a member seelcted from the group consisting of hydrogen, lower alkanoyl, lower alkanesulfonyl benzenesulfonyl and lower alkylbenzenesulfonyl; Z is a member selected from the group consisting of methylene, hydroxymethylene and carbonyl; Z' is a member selected from the group consisting of carbonyl,

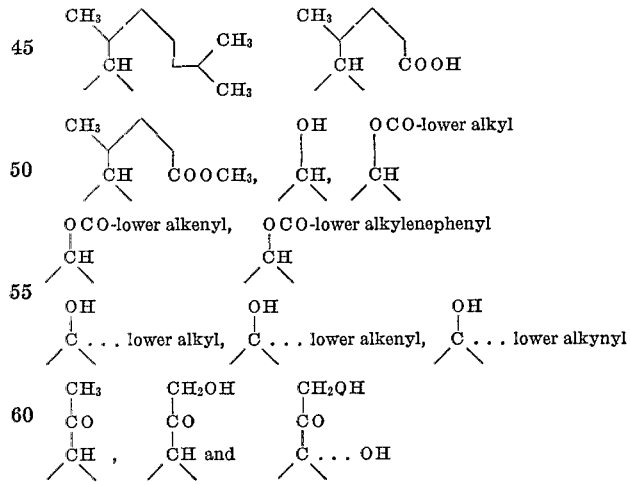

and the ripple mark (⸾) is a generic indication of α- and β-configurations, which comprises treating the corresponding 2,3-epoxy-steroid with a member selected from the group consisting of thiocyanic acid and its salts in an inert solvent at a temperature from about 0° C. to the boiling point of the solvent used for less than 5 days.

7. A process according to claim 6, wherein the thiocyanatohydrin compound is prepared by treating the corresponding 2,3-epoxy-steroid with a member selected from the group consisting of thiocyanic acid and its salts in an inert solvent at a temperature from about 0° C. to the boiling point of the solvent used for less than 5 days in the presence of a member selected from the group consisting of an acid and a base.

8. A process according to claim 6, wherein the thiocyanatohydrin compound is prepared by treating the corresponding 2,3-epoxy-steroid with thiocyanic acid in an inert solvent at a temperature from about 0° C. to the boiling point of the solvent used for less than 5 days.

9. A process according to claim 6, wherein the thiocyanatohydrin compound is prepared by treating the corresponding 2,3-epoxy-steroid with thiocyanic acid in an inert solvent selected from one or more members consisting of water, methanol, acetone, ether, tetrahydrofuran, dioxane, chloroform and dichloromethane at a temperature from about 0° C. to the boiling point of the solvent used for less than 5 days.

10. A compound selected from the group consisting of steroids of the formulae:

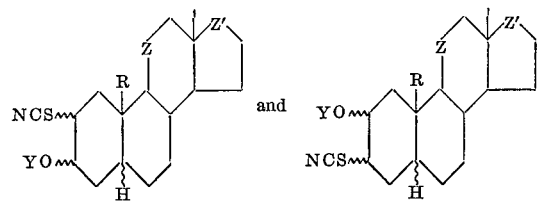

wherein R is a member selected from the group consisting of hydrogen and methyl; Z is a member selected from the group consisting of methylene, hydroxymethylene and carbonyl; Z' is a member selected from the group consisting of carbonyl,

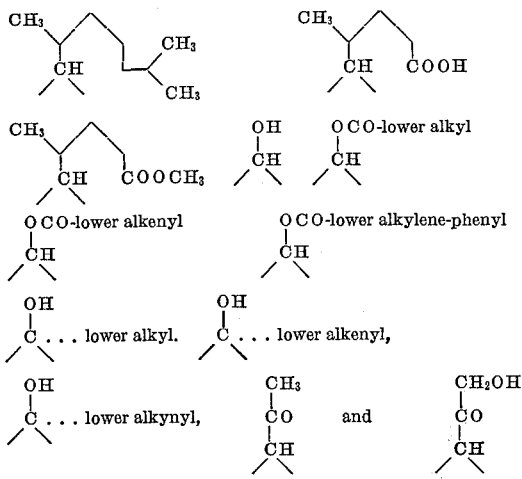

when Y is a member selected from the group consisting of lower alkanesulfonyl, benzenesulfonyl and lower alkylbenzenesulfonyl; and Z' is a member selected from the group consisting of

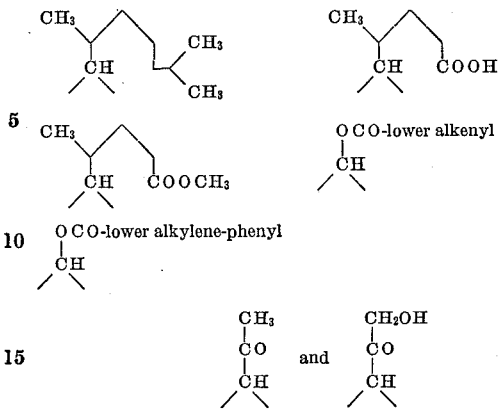

when Y is a member selected from the group consisting of hydrogen and lower alkanoyl; and the ripple mark (∫) is a generic indication of α- and β-configurations.

11. A compound selected from the group consisting of steroids of the formulae:

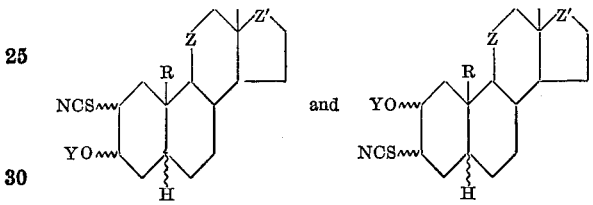

wherein R is a member selected from the group consisting of hydrogen and methyl; Z is a member selected from the group consisting of hydroxymethylene and carbonyl; Z' is

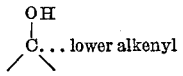

and Y is a member selected from the group consisting of hydrogen and lower alkanoyl; and the ripple mark (∫) is a generic indication of α- and β-configurations.

References Cited
UNITED STATES PATENTS 3,290,294 12/1966 Komeno _____ 260—239.5
3,301,876 1/1967 Klimstra _____ 260—239.55
3,405,124 10/1968 Klimstra _____ 260—239.55

LEWIS GOTTS, Primary Examiner
J. R. BROWN, Assistant Examiner

U.S. Cl. X.R.
260—397.1, 397.2, 397.4, 397.45, 397.47, 397.5, 999